United States Patent
Ohhara

(10) Patent No.: US 9,499,208 B2
(45) Date of Patent: Nov. 22, 2016

(54) VEHICLE CENTER PILLAR

(71) Applicant: SUZUKI MOTOR CORPORATION, Hamamatsu (JP)

(72) Inventor: Kousuke Ohhara, Hamamatsu (JP)

(73) Assignee: SUZUKI MOTOR CORPORATION, Hamamatsu (JP)

(*) Notice: Subject to any disclaimer, the term of this patent is extended or adjusted under 35 U.S.C. 154(b) by 0 days.

(21) Appl. No.: 14/827,094

(22) Filed: Aug. 14, 2015

(65) Prior Publication Data

US 2016/0059894 A1  Mar. 3, 2016

(30) Foreign Application Priority Data

Aug. 29, 2014 (JP) .................................. 2014-175249

(51) Int. Cl.
*B62D 25/04* (2006.01)
*B62D 21/15* (2006.01)

(52) U.S. Cl.
CPC ............. *B62D 25/04* (2013.01); *B62D 21/157* (2013.01)

(58) Field of Classification Search
CPC ..... B62D 21/157; B62D 25/02; B62D 25/04
USPC ........................................ 296/187.12, 193.06
See application file for complete search history.

(56) References Cited

U.S. PATENT DOCUMENTS

| 7,510,234 | B2* | 3/2009 | Ameloot | B62D 25/04 296/187.12 |
| 8,491,047 | B1* | 7/2013 | Moll | B62D 25/04 296/193.06 |
| 2006/0208537 | A1* | 9/2006 | Dingman | B62D 25/04 296/193.05 |
| 2015/0175211 | A1* | 6/2015 | Shinoda | B62D 25/04 296/193.06 |
| 2016/0039470 | A1* | 2/2016 | Sakuragi | B62D 21/157 296/193.06 |
| 2016/0046328 | A1* | 2/2016 | Steffens | B21D 47/01 296/193.06 |

FOREIGN PATENT DOCUMENTS

JP  2007069667  3/2007

* cited by examiner

*Primary Examiner* — Jason S Daniels
(74) *Attorney, Agent, or Firm* — Silicon Valley Patent Group LLP

(57) ABSTRACT

A center pillar according to the present invention has a configuration in which a central portion of an inner panel on an interior side includes an inner front surface and an inner rear surface that respectively extend from ends of a front flange and a rear flange toward a vehicle interior side, an inner central surface that is located between the inner front surface and the inner rear surface, first beads that respectively project in a step shape from a front edge and a rear edge of the inner central surface toward the vehicle interior side, and second beads that further project in a step shape toward the vehicle interior side from the first beads and are respectively continuous with ends of the inner front surface and the inner rear surface on the vehicle interior side, the first beads and the second beads extending below a belt line.

8 Claims, 4 Drawing Sheets

B-B

VEHICLE CENTER PILLAR

CROSS-REFERENCE TO RELATED APPLICATION

This application is based upon and claims the benefit of priority from the prior Japanese Patent Application No. 2014-175249, filed on Aug. 29, 2014, the entire contents of which are incorporated herein by reference.

FIELD

The present invention relates to a vehicle center pillar that extends in a vertical direction at the center of a vehicle lateral portion and that includes a side body outer panel on the outer side and a center pillar inner panel on the interior side.

BACKGROUND

A center pillar extending in a vertical direction is disposed at the center of a vehicle lateral portion, that is, between a front door and a rear door, in a vehicle such as an automobile. As disclosed in Japanese Patent Laid-open Publication No. JP 2007-069667A, in general, the center pillar is configured by joining a pillar outer panel constituting a surface on the outer side and a pillar inner panel constituting a surface on the interior side.

The center pillar is required to have high rigidity in order to prevent deformation due to loads applied in a collision such as a collision against the lateral surface (lateral collision). Therefore, in general, the center pillar has a hat-shaped pillar outer panel that bulges out toward the vehicle outer side and a hat-shaped pillar inner panel that bulges out toward the vehicle interior side. As a result, a closed cross section is formed by joining the pillar outer panel and the pillar inner panel together, and therefore, the rigidity of the center pillar is improved. However, when the pillar inner panel bulges out toward the vehicle interior side, the bulge portion projects toward the inside of a compartment, and thus a compartment space is narrowed. In particular, in a configuration in which the upper portion of the center pillar is inclined toward the vehicle interior side, there has been a problem in that a space in the upper portion of a compartment is narrowed and passenger comfort is deteriorated.

In view of the foregoing problems, it is an object of the present invention to provide a vehicle center pillar capable of improving comfort by ensuring a space in a compartment while favorably suppressing deformation by ensuring high rigidity.

SUMMARY OF THE DISCLOSURE

In order to solve the foregoing problems, a vehicle center pillar according to the present invention having a typical configuration is a vehicle center pillar extending in a vertical direction at a center of a vehicle lateral portion and comprising a side body outer panel on an outer side and a center pillar inner panel on an interior side, wherein a region of the vehicle center pillar below a belt line extends substantially vertically, and a region of the vehicle center pillar above the belt line is inclined toward a vehicle interior side as the region extends upward, the side body outer panel and the center pillar inner panel each includes a central portion extending in the vertical direction and a front flange and a rear flange that are respectively formed at a front edge and a rear edge of the central portion, a closed cross section is formed with the side body outer panel and the center pillar inner panel by joining the front flange of the side body outer panel and the front flange of the center pillar inner panel together and joining the rear flange of the side body outer panel and the rear flange of the center pillar inner panel together, a region of the central portion of the center pillar inner panel above the belt line is gradually narrowed as the region extends upward, as viewed from the lateral side, the central portion of the center pillar inner panel includes an inner front surface and an inner rear surface that respectively extend from a rear end of the front flange of the center pillar inner panel and a front end of the rear flange of the center pillar inner panel toward the vehicle interior side, an inner central surface that is located between the inner front surface and the inner rear surface, first beads that respectively project in a step shape from a front edge and a rear edge of the inner central surface toward the vehicle interior side, and second beads that further project in a step shape toward the vehicle interior side from the first beads and are respectively continuous with ends of the inner front surface and the inner rear surface on the vehicle interior side, and the first beads and the second beads extend below the belt line.

With the above configuration, the region of the central portion of the center pillar inner panel above the belt line, that is, the region inclined toward the vehicle interior side is gradually narrowed as the region extends upward. This makes it possible to further enlarge a space in the upper portion of a compartment. The step-shaped first beads and second beads are formed in the central portion of the center pillar inner panel. The first beads and the second beads project toward the vehicle interior side in a step shape, namely, in the central portion of the center pillar inner panel, a space between the first beads and second beads is recessed toward the vehicle outer side in a step shape. The projection of the central portion toward the vehicle interior side is thereby suppressed, thus making it possible to further enlarge the space in the compartment.

In this case, since the region of the central portion above the belt line, which is gradually narrowed, is bent in two stages at the first beads and the second beads, the rigidity of that region is dramatically improved. This makes it possible to effectively suppress deformation due to loads applied in a collision. Accordingly, with the above configuration, it is possible to improve comfort by ensuring the space in the compartment while favorably suppressing deformation by ensuring high rigidity.

It is preferable that the first beads and the second beads extend from a vicinity of an upper end of the center pillar inner panel below the belt line. With this configuration, the first beads and the second beads are provided in substantially the entire region of the center pillar inner panel above the belt line, that is, substantially the entire region inclined to the vehicle interior side. Accordingly, it is possible to improve the rigidity of the region inclined to the vehicle interior side and to favorably suppress the deformation thereof.

It is preferable that the central portion of the side body outer panel includes an outer front surface and an outer rear surface that respectively extend from a rear end of the front flange of the side body outer panel and a front end of the rear flange of the side body outer panel toward a vehicle outer side, and an outer central surface that extends in the vertical direction between the outer front surface and the outer rear surface, and the outer front surface and the outer rear surface are respectively located in a range of the first beads or a range of the second beads in a vehicle front-rear direction.

Thereby, loads applied to the side body outer panel can be favorably received by the first beads and the second beads of the center pillar inner panel. Accordingly, it is possible to further suppress the deformation of the side body outer panel, and in turn, the deformation of the center pillar.

It is preferable that a sum of a length of each of the first beads and a length of each of the second beads in a vehicle front-rear direction is equal to or smaller than a length of the inner central surface in the vehicle front-rear direction. Thereby, the length of the inner central surface is longer than the total length of each of the first beads and each of the second beads in the vehicle front-rear direction. Accordingly, the area of the inner central surface can be ensured, and therefore, it is possible to favorably attach parts and the like to the inner central surface.

With the present invention, it is possible to provide a vehicle center pillar capable of improving comfort by ensuring a space in a compartment while favorably suppressing deformation by ensuring high rigidity.

DETAILED DESCRIPTION

Figure 1:
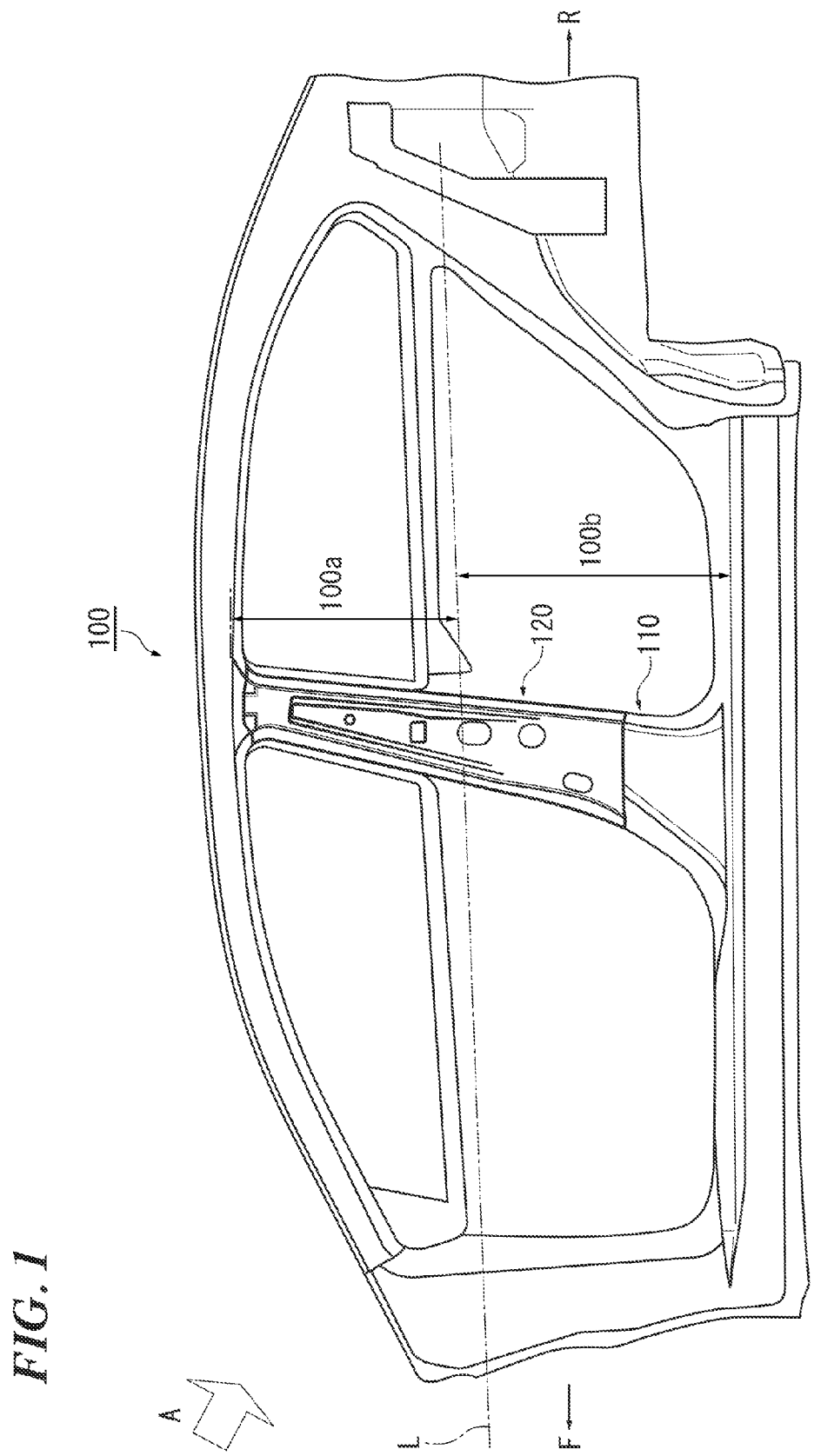
FIG. 1 is a side view of a vehicle including a vehicle center pillar according to one embodiment.

Hereinafter, a preferred embodiment of the present invention will be described in detail with reference to the accompanying drawings. The dimensions, materials, and other specific numerical values described in this embodiment are merely examples for facilitating the understanding of the present invention, and are not to be construed as limiting the invention unless otherwise stated. It should be noted that elements constituting substantially identical functions and configurations are denoted by identical reference numerals in the present specification and the drawings, and hence redundant description has been omitted. Also, illustration of elements that are not directly relevant to the present invention has been omitted.

Figure 2:
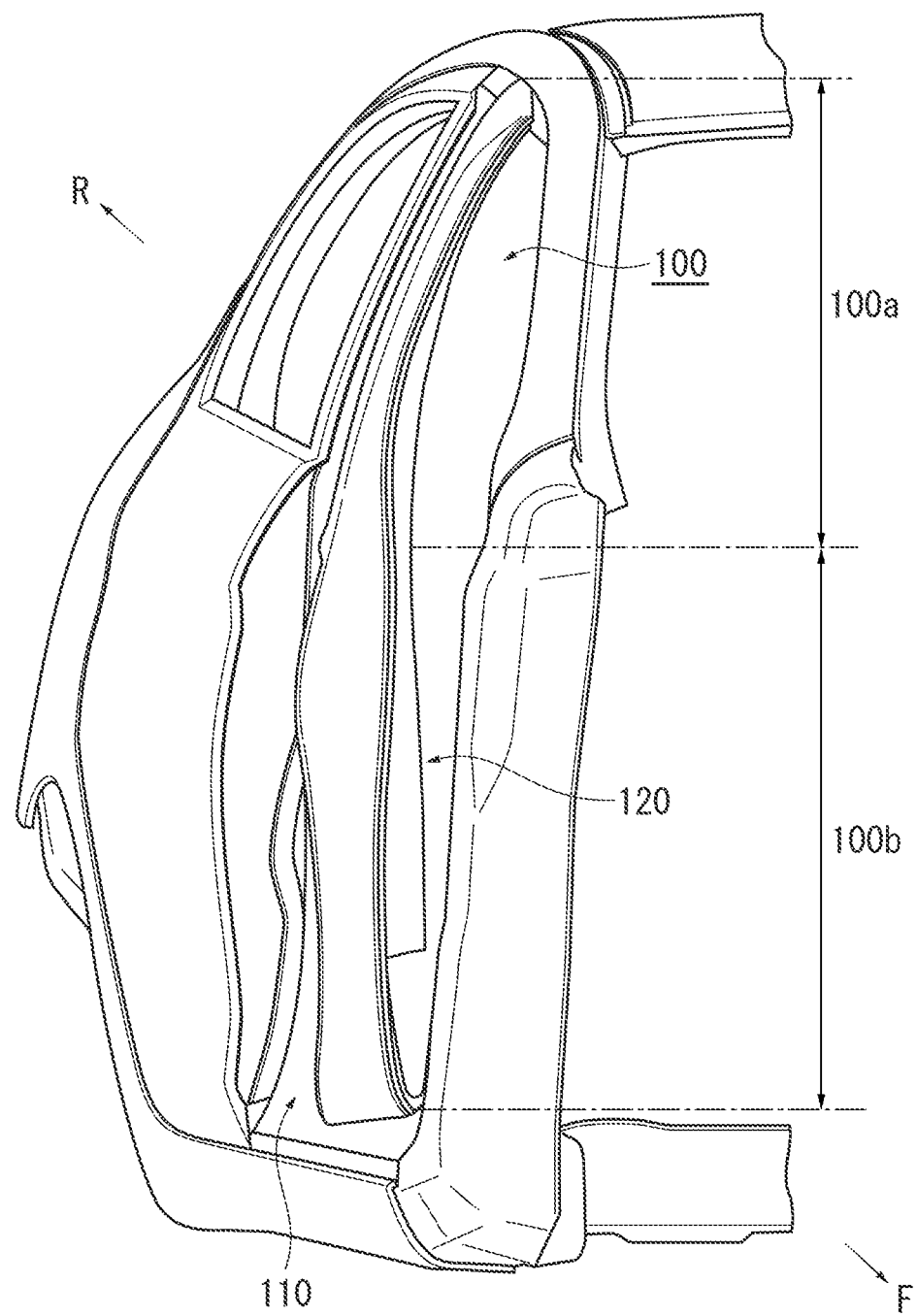
FIG. 2 is a diagram of the vehicle shown in FIG. 1, as viewed from direction A.

FIG. 1 is a side view of a vehicle including a vehicle center pillar according to this embodiment, and shows a state in which a side surface on the vehicle right side is viewed from the vehicle interior side. FIG. 2 is a diagram of the vehicle shown in FIG. 1, as viewed from direction A, and shows a state in which the vehicle lateral portion is viewed from the vehicle outer front side (direction A). In FIG. 2, a front door is not shown in order to facilitate the understanding. As shown in FIG. 1, the vehicle center pillar (referred to as "center pillar 100" hereinafter) according to this embodiment is a member extending in the vertical direction at the center of the vehicle lateral portion.

As shown in FIG. 1, in the center pillar 100, the outer surface is constituted by a side body outer panel (referred to as "outer panel 110" hereinafter) on the outer side, and the inner surface is constituted by a center pillar inner panel (referred to as "inner panel 120") on the interior side. As shown in FIG. 2, a region (referred to as "lower region 100b" hereinafter) of the center pillar 100 below a belt line L (see FIG. 1) extends substantially vertically, and a region (referred to as "upper region 100a" hereinafter) of the center pillar 100 above the belt line L is inclined toward the vehicle interior side as it extends upward.

Figure 3:
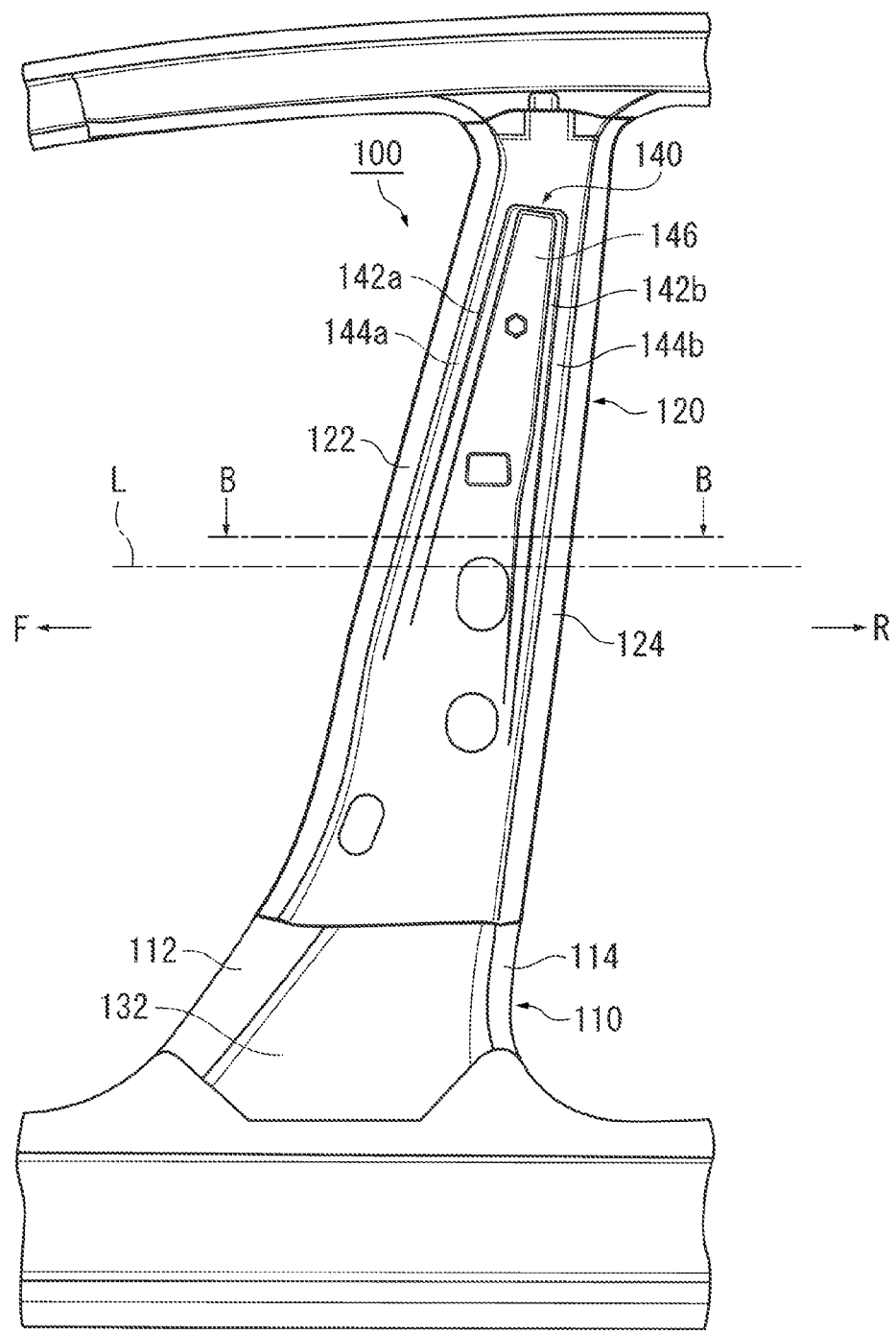
FIG. 3 is an enlarged view of an area near the center pillar in FIG. 1.
Figure 4:
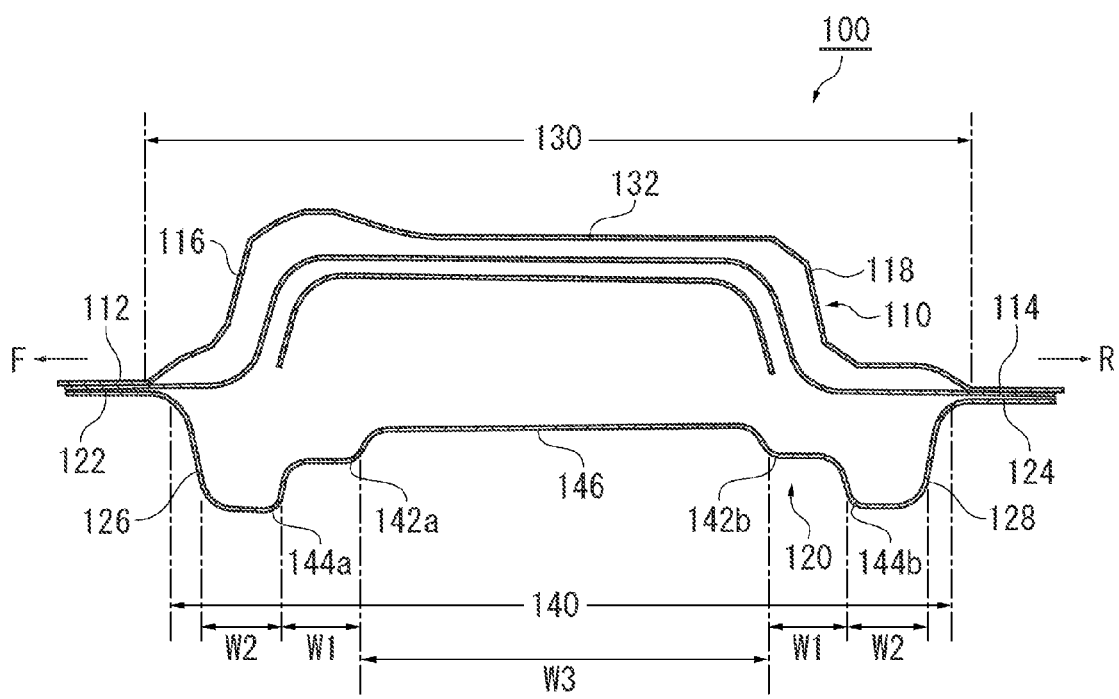
FIG. 4 is a cross-sectional view taken along line B-B in FIG. 3.

FIG. 3 is an enlarged view of an area near the center pillar in FIG. 1. FIG. 4 is a cross-sectional view taken along line B-B in FIG. 3. As shown in FIGS. 3 and 4, the inner panel 120 includes a central portion 140 extending in the vertical direction, and a front flange 122 and a rear flange 124 that are respectively formed at the front edge and the rear edge of the central portion 140. As shown in FIGS. 3 and 4, the outer panel 110 also includes a central portion 130 extending in the vertical direction, and a front flange 112 and a rear flange 114 that are respectively formed at the front edge and the rear edge of the central portion 130.

In the center pillar 100 of this embodiment, a cross section of the outer panel 110 has a shape in which the center portion 130 bulges out toward the vehicle outer side with respect to the front flange 112 and the rear flange 114 and a cross section of the inner panel 120 has a shape in which the center portion 140 bulges out toward the vehicle interior side with respect to the front flange 122 and the rear flange 124. As shown in FIG. 4, a closed cross section is formed with the outer panel 110 and the inner panel 120 by joining the front flanges 112 and 122 together and joining the rear flanges 114 and 124 together. By forming the closed cross section in the center pillar 100 in this manner, the rigidity of the center pillar 100 can be improved, and deformation due to loads applied in a collision can be suppressed.

With the center pillar 100 of this embodiment, a region of the central portion 140 of the inner panel 120 above the belt line L is gradually narrowed, as viewed from the lateral side, as it extends upward. As a result, the projection amount of the central portion 140 of the inner panel 120 toward the space in the upper portion of the compartment is reduced. Accordingly, the space in the upper portion of the compartment can be further enlarged.

The center pillar 100 of this embodiment is characterized in that the central portion 140 of the inner panel 120 is provided with step-shaped first beads 142a and 142b and second beads 144a and 144b that extend below the belt line L. Specifically, in the central portion 140 of the inner panel 120, an inner front surface 126 and an inner rear surface 128 respectively extend from the rear end of the front flange 122 and the front end of the rear flange 124 toward the vehicle interior side, and an inner central surface 146 is located between the inner front surface 126 and the inner rear surface 128.

In the central portion 140 of the inner panel 120, the first beads 142a and 142b respectively project in a step shape from the front edge and the rear edge of the inner central surface 146 toward the vehicle interior side, and the second beads 144a and 144b further project in a step shape from the first beads 142a and 142b toward the vehicle interior side and are respectively continuous with the ends of the inner front surface 126 and the inner rear surface 128 on the vehicle interior side. Since the first beads 142a and 142b, and the second beads 144a and 144b project in a step shape toward the vehicle interior side as shown in FIG. 4, the inner central surface 146 is located on the vehicle outermost side. That is, the central portion 140 of the inner panel 120 bulges out toward the vehicle interior side on the outer part with respect to the vehicle front-rear direction, and bulges out toward the vehicle outer side on the interior part with respect to the vehicle front-rear direction though it does not reach the vehicle outer side with respect to the front flange 122 and the rear flange 124.

With the above configuration, the projection amount of the central portion 140 of the inner panel 120 toward the vehicle interior side is reduced, and therefore, the space in the compartment can be further enlarged and passenger comfort can be improved. In this case, since the upper region 100a of the central portion 140 is bent in two stages at the first beads 142a and 142b and the second beads 144a and 144b, the rigidity of the upper region 100a is dramatically improved. Accordingly, it is possible to improve comfort by ensuring the space in the compartment while favorably suppressing deformation by ensuring high rigidity.

In particular, in this embodiment, the first beads 142a and 142b and the second beads 144a and 144b extend from the vicinity of the upper end of the inner panel 120 down to below the belt line L. That is, in the center pillar 100 of this embodiment, the first beads 142a and 142b and the second beads 144a and 144b are provided in substantially the entire region of the upper region 100a, which is inclined toward the vehicle interior side. This makes it possible to improve the rigidity against loads that tend to further incline the upper region 100a toward the vehicle interior side and against loads that tend to warp the upper region 100a toward the vehicle outer side, that is, to cause the upper region 100a to extend vertically, and deformation due to the loads can be favorably suppressed.

Furthermore, in this embodiment, as shown in FIG. 4, the sum of a length W1 of each of the first beads 142a and 142b in the vehicle front-rear direction and a length W2 of each of the second beads 144a and 144b in the vehicle front-rear direction in the central portion 140 of the inner panel 120 is made equal to or smaller than a length W3 of the inner central surface 146 in the vehicle front-rear direction. That is, the relationship W1+W2≤W3 is satisfied. This makes it possible to ensure the area of the inner central surface 146 of the central portion 140 of the inner panel 120, and therefore, it is possible to favorably attach parts and the like to the inner central surface 146. Moreover, in this embodiment, the first beads 142a and 142b and the second beads 144a and 144b have substantially the same lengths in the front-rear direction. That is, the relationship W1≈W2 is satisfied. Although this is not an essential condition, this makes it possible to further improve the above-described effect.

Here, as shown in FIG. 4, the central portion 130 of the outer panel 110 of this embodiment includes an outer front surface 116 and an outer rear surface 118 that respectively extend from the rear end of the front flange 112 and the front end of the rear flange 114 toward the vehicle outer side, and an outer central surface 132 that extends in the vertical direction therebetween. In this embodiment, the outer front surface 116 and the outer rear surface 118 are respectively located in a range of the first beads 142a and 142b or the second beads 144a and 144b in the vehicle front-rear direction. This makes it possible to efficiently transmit loads applied to the outer panel 110 to the first beads 142a and 142b and the second beads 144a and 144b of the inner panel 120, and therefore, it is possible to more effectively suppress the deformation of the outer panel 110, and in turn, the deformation of the center pillar 100.

While a preferred embodiment of the present invention has been described above with reference to the accompanying drawings, it should be appreciated that the present invention is not limited to the embodiment shown above. It will be apparent for a person skilled in the art that various modifications and variations may be made within the scope of the invention as defined in the appended claims, and those modifications and variations should be understood to be included within the technical scope of the present invention.

The present invention can be used in a vehicle center pillar that extends in a vertical direction at the center of a vehicle lateral portion and that includes a side body outer panel on the outer side and a center pillar inner panel on the interior side.

The invention claimed is:

1. A vehicle center pillar extending in a vertical direction at a center of a vehicle lateral portion and comprising:
   a side body outer panel on an outer side; and
   a center pillar inner panel on an interior side; wherein a lower region of the vehicle center pillar is below a belt line; and
   wherein an upper region of the vehicle center pillar is above the belt line and is inclined toward a vehicle interior side;
   wherein the side body outer panel and the center pillar inner panel each includes:
      a central portion extending in the vertical direction; and
      a front flange and a rear flange that are respectively formed at a front edge and a rear edge of the central portion;
   wherein a closed cross section is formed with the side body outer panel and the center pillar inner panel by joining the front flange of the side body outer panel and the front flange of the center pillar inner panel together and joining the rear flange of the side body outer panel and the rear flange of the center pillar inner panel together;
   wherein a region of the central portion of the center pillar inner panel above the belt line is gradually narrowed as the upper region extends upward, as viewed from a lateral side;
   wherein the central portion of the center pillar inner panel includes:
      an inner front surface and an inner rear surface that respectively extend from a rear end of the front flange of the center pillar inner panel and a front end of the rear flange of the center pillar inner panel toward the vehicle interior side;
      an inner central surface that is located between the inner front surface and the inner rear surface;
      first beads that project in a step shape from a front edge and a rear edge of the inner central surface toward the vehicle interior side; and
      second beads that project in a step shape toward the vehicle interior side from the first beads and are respectively continuous with ends of the inner front surface and the inner rear surface on the vehicle interior side; and
   wherein the first beads and the second beads extend below the belt line.

2. The vehicle center pillar according to claim 1, wherein the first beads and the second beads extend from a vicinity of an upper end of the center pillar inner panel below the belt line.

3. The vehicle center pillar according to claim 2, wherein the central portion of the side body outer panel includes:
   an outer front surface and an outer rear surface that respectively extend from a rear end of the front flange of the side body outer panel and a front end of the rear flange of the side body outer panel toward a vehicle outer side; and
   an outer central surface that extends in the vertical direction between the outer front surface and the outer rear surface;
   wherein the outer front surface and the outer rear surface are respectively located in a range of the first beads or a range of the second beads in a vehicle front-rear direction.

4. The vehicle center pillar according to claim 3, wherein a sum of a length of each of the first beads and a length of each of the second beads in the vehicle front-rear direction is equal to or smaller than a length of the inner central surface in the vehicle front-rear direction.

5. The vehicle center pillar according to claim 2, wherein a sum of a length of each of the first beads and a length of each of the second beads in a vehicle front-rear direction is equal to or smaller than a length of the inner central surface in the vehicle front-rear direction.

6. The vehicle center pillar according to claim 1, wherein the central portion of the side body outer panel includes:

an outer front surface and an outer rear surface that respectively extend from a rear end of the front flange of the side body outer panel and a front end of the rear flange of the side body outer panel toward a vehicle outer side; and an outer central surface that extends in the vertical direction between the outer front surface and the outer rear surface;

wherein the outer front surface and the outer rear surface are respectively located in a range of the first beads or a range of the second beads in a vehicle front-rear direction.

7. The vehicle center pillar according to claim 6, wherein a sum of a length of each of the first beads and a length of each of the second beads in the vehicle front-rear direction is equal to or smaller than a length of the inner central surface in the vehicle front-rear direction.

8. The vehicle center pillar according to claim 1, wherein a sum of a length of each of the first beads and a length of each of the second beads in a vehicle front-rear direction is equal to or smaller than a length of the inner central surface in the vehicle front-rear direction.

* * * * *